United States Patent
Pfohl et al.

(10) Patent No.: US 9,586,473 B2
(45) Date of Patent: Mar. 7, 2017

(54) VEHICLE WITH SELECTIVELY REVERSIBLE COOLING FAN

(71) Applicant: DEERE & COMPANY, Moline, IL (US)

(72) Inventors: Kevin L. Pfohl, Dickeyville, WI (US); John M. Chesterman, Dubuque, IA (US); Michael R. Gratton, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 741 days.

(21) Appl. No.: 13/942,389

(22) Filed: Jul. 15, 2013

(65) Prior Publication Data

US 2015/0017901 A1  Jan. 15, 2015

(51) Int. Cl.
*B60K 11/06* (2006.01)
*B60K 11/02* (2006.01)
*F01P 5/04* (2006.01)
*E02F 9/20* (2006.01)
*E02F 9/08* (2006.01)

(52) U.S. Cl.
CPC .............. *B60K 11/06* (2013.01); *B60K 11/02* (2013.01); *E02F 9/2095* (2013.01); *F01P 5/043* (2013.01); *E02F 9/0866* (2013.01)

(58) Field of Classification Search
CPC .......... B60K 11/02; B60K 11/06; F01P 5/043; E02F 9/2095; E02F 9/0866
USPC ......... 454/69, 154, 148, 105, 112, 117, 141; 318/289; 180/68.2
See application file for complete search history.

(56) References Cited

U.S. PATENT DOCUMENTS

| 3,872,842 | A * | 3/1975 | Medley | F01P 7/046 |
| | | | | 123/41.11 |
| 6,750,623 | B1 * | 6/2004 | McCauley | F01P 7/044 |
| | | | | 318/260 |
| 7,066,144 | B2 * | 6/2006 | Harunari | F02D 11/105 |
| | | | | 123/399 |

(Continued)

FOREIGN PATENT DOCUMENTS

| JP | 2004197682 A | 7/2004 |
| WO | 2007004750 A1 | 1/2007 |

(Continued)

OTHER PUBLICATIONS

Richard Harris, Running on Fumes, May 4, 2008, http://www.knoxnews.com/business/running-on-fumes-ep-411692089-359905131.html.*

(Continued)

*Primary Examiner* — Gregory Huson
*Assistant Examiner* — Dana Tighe
(74) *Attorney, Agent, or Firm* — Taft Stettinius & Hollister, LLP; Stephen F. Rost

(57) ABSTRACT

A work vehicle includes a cooling fan that selectively and/or periodically runs in reverse in order to discharge accumulated dirt or debris from one or more coolers. The reverse activation of the fan is prevented from initiating when the operator of the running vehicle is outside the operator cab in the vicinity of the coolers. In an exemplary embodiment, activation of a parking brake interrupts or prevents reverse activation of the fan, though a fuel door sensor may also be used. A minimum engine speed may be specified to ensure adequate power for maximum fan power during the reverse operation.

20 Claims, 6 Drawing Sheets

(56) References Cited

U.S. PATENT DOCUMENTS

| | | | | |
|---|---|---|---|---|
| 7,195,093 B1* | 3/2007 | Ahmadi | ............... | B60K 28/12 |
| | | | | 180/286 |
| 7,459,870 B2* | 12/2008 | Beck | ............... | F01P 11/12 |
| | | | | 318/260 |
| 8,281,586 B2* | 10/2012 | Barton | ............... | F02B 37/24 |
| | | | | 60/600 |
| 2006/0230751 A1 | 10/2006 | Huang et al. | | |
| 2007/0089874 A1* | 4/2007 | Tuntland | ............... | F28F 9/0234 |
| | | | | 165/280 |
| 2012/0205172 A1* | 8/2012 | Werner | ............... | B62D 25/10 |
| | | | | 180/69.24 |
| 2015/0308079 A1* | 10/2015 | Vigholm | ............... | F15B 21/14 |
| | | | | 180/14.1 |

FOREIGN PATENT DOCUMENTS

| | | |
|---|---|---|
| WO | 2012124530 A1 | 9/2012 |
| WO | 2012135825 A1 | 10/2012 |

OTHER PUBLICATIONS

Extended European Search Report mailed Jan. 13, 2015 in related European Application No. 14174614.9.
Extended European Search Report mailed Jan. 13, 2015 in related European Application No. 14177146.9.

\* cited by examiner

VEHICLE WITH SELECTIVELY REVERSIBLE COOLING FAN

TECHNICAL FIELD

The present disclosure relates to a cooling system of a work vehicle. More particularly, the present disclosure relates to a cooling system that facilitates timely cooling fan reversal in a work vehicle, and to a method for using the same.

BACKGROUND

During operation of a work vehicle, a cooling fan may draw air through one or more radiators to cool engine coolant and/or hydraulic fluid, especially when the work vehicle is operating in warm temperatures. Particularly for vehicles used in dusty and/or dirty environments, such as on farms or construction sites, dirt and debris in the air near the radiators may be drawn into the radiator fins by the cooling fan, necessitating cleaning to restore efficient function of the radiator.

SUMMARY

The present disclosure provides a work vehicle including a cooling fan that selectively and/or periodically runs in reverse in order to discharge accumulated dirt or debris from one or more coolers. The reverse activation of the fan is prevented from initiating—or if already underway, from continuing—when the operator of the running vehicle is outside the operator cab in the vicinity of the coolers. In an exemplary embodiment, activation of a parking brake interrupts or prevents reverse activation of the fan, though a fuel door sensor may also be used. A minimum engine speed may be specified to ensure adequate power for maximum fan power during the reverse operation.

According to an embodiment of the present disclosure, a work vehicle is provided including: a chassis; at least one traction device supporting the chassis on the ground; an engine operably coupled to the at least one traction device to propel the chassis across the ground; a brake system including a parking brake actuatable to maintain the vehicle in a stopped position; a cooling system including: a cooler that receives a fluid; a fan having: a first mode of operation, wherein the fan directs air across the cooler in a first direction; and a second mode of operation, wherein the fan directs air across the cooler in a second direction opposite the first direction; and a controller that prevents operation of the fan in the second mode of operation when the parking brake is actuated.

According to another embodiment of the present disclosure, a work vehicle is provided including: a chassis; at least one traction device supporting the chassis on the ground; an engine defining a variable engine speed and being operably coupled to the at least one traction device to propel the chassis across the ground; a cooling system including: a cooler that receives a fluid; a fan having: a first mode of operation, wherein the fan directs air across the cooler in a first direction; and a second mode of operation, wherein the fan directs air across the cooler in a second direction opposite the first direction; and a controller that prevents operation of the fan in the second mode of operation when the engine speed is below a predetermined setpoint.

According to yet another embodiment of the present disclosure, a method of operating a work vehicle is provided, the work vehicle including an engine, at least one cooling system including a cooler, and a parking brake system actuatable to maintain the vehicle in a stopped position, the method including the steps of: directing air across the cooler in a forward direction to effect cooling of the cooler; directing air across the cooler in a reverse direction to effect cleaning of the cooler; and interrupting or preventing the flow of air in the second direction when the parking brake system is actuated.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1A:
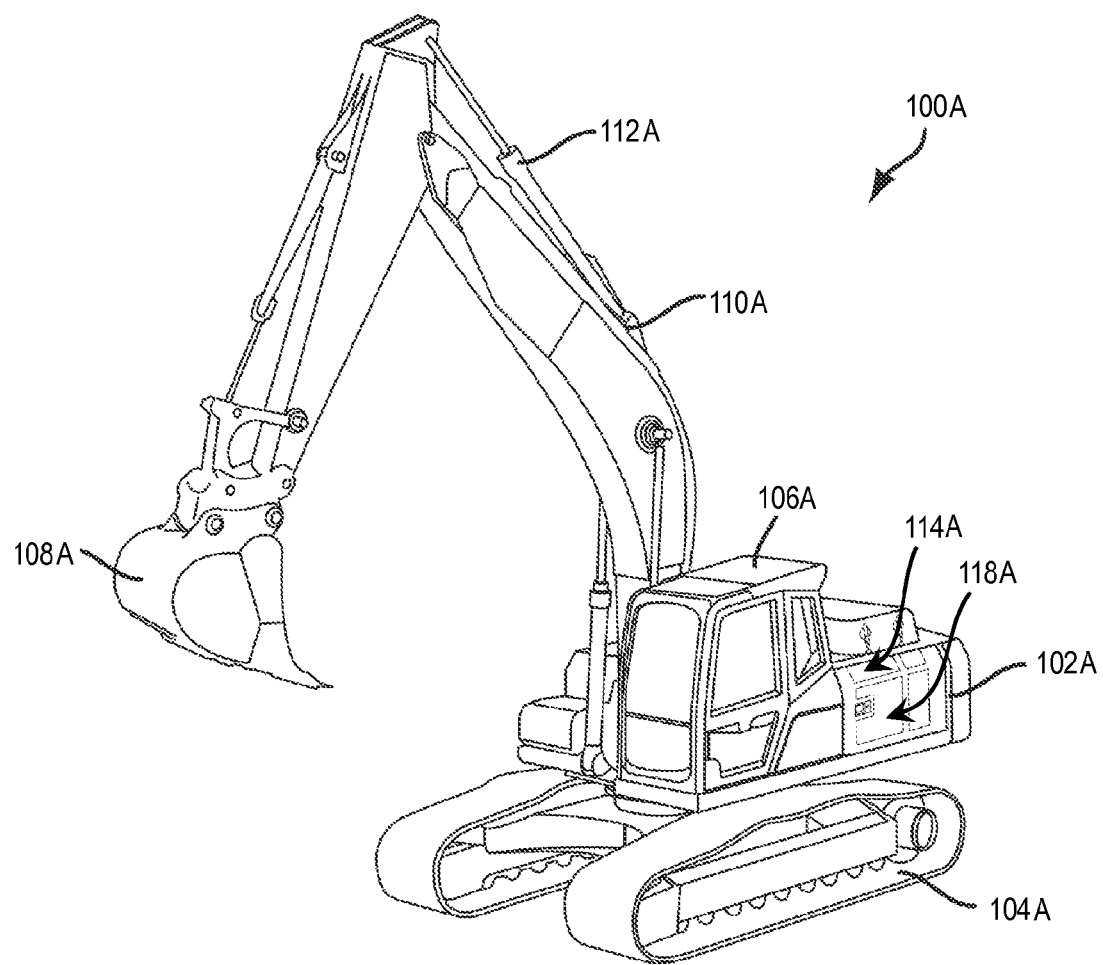
FIG. 1A is a perspective view of an exemplary excavator of the present disclosure.

Referring initially to FIG. 1A, a work vehicle 100 is provided in the form of an excavator 100A. Alternatively, work vehicle 100 may also be in the form of loader 100B shown in FIG. 1B. It is within the scope of the present disclosure that vehicle 100 be in the form of any other vehicle including a cooling system, particularly a vehicle designed for use in off-highway environments such as a bulldozer, a motor grader, or another construction, agricultural, or utility vehicle, for example.

Except as otherwise noted herein, reference numbers used to refer to components of vehicle 100A are correspondingly used in reference to wheel drive vehicle 100B, except with "B" replacing the "A" identifier. In addition, vehicles 100A and 100B and their associated structures may be referred to generically as their numeric identifier only, e.g., "100" may be used herein to refer to either of vehicles 100A, 100B.

Figure 1B:
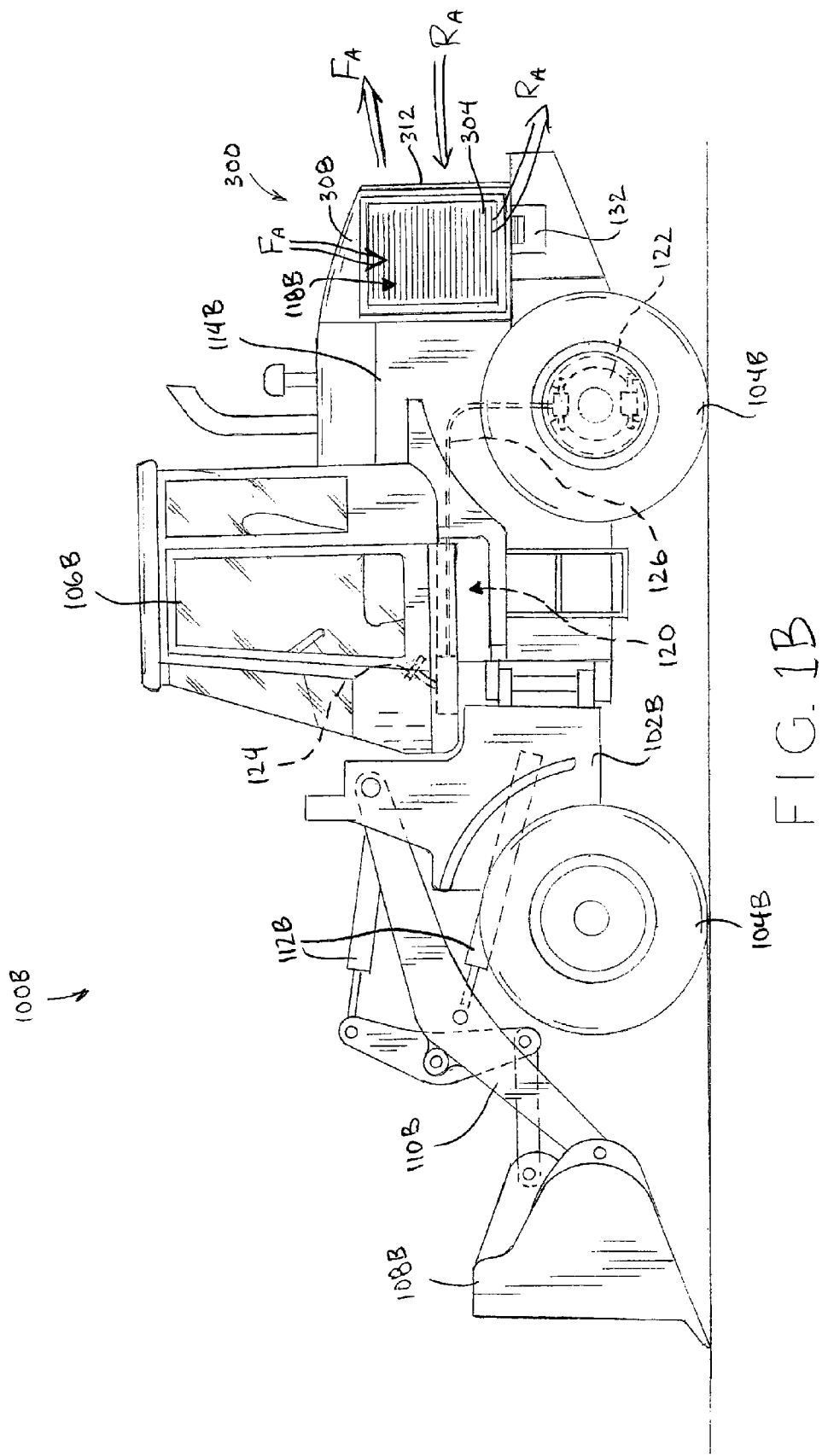
FIG. 1B is a perspective view of an exemplary loader of the present disclosure.
Figure 2:
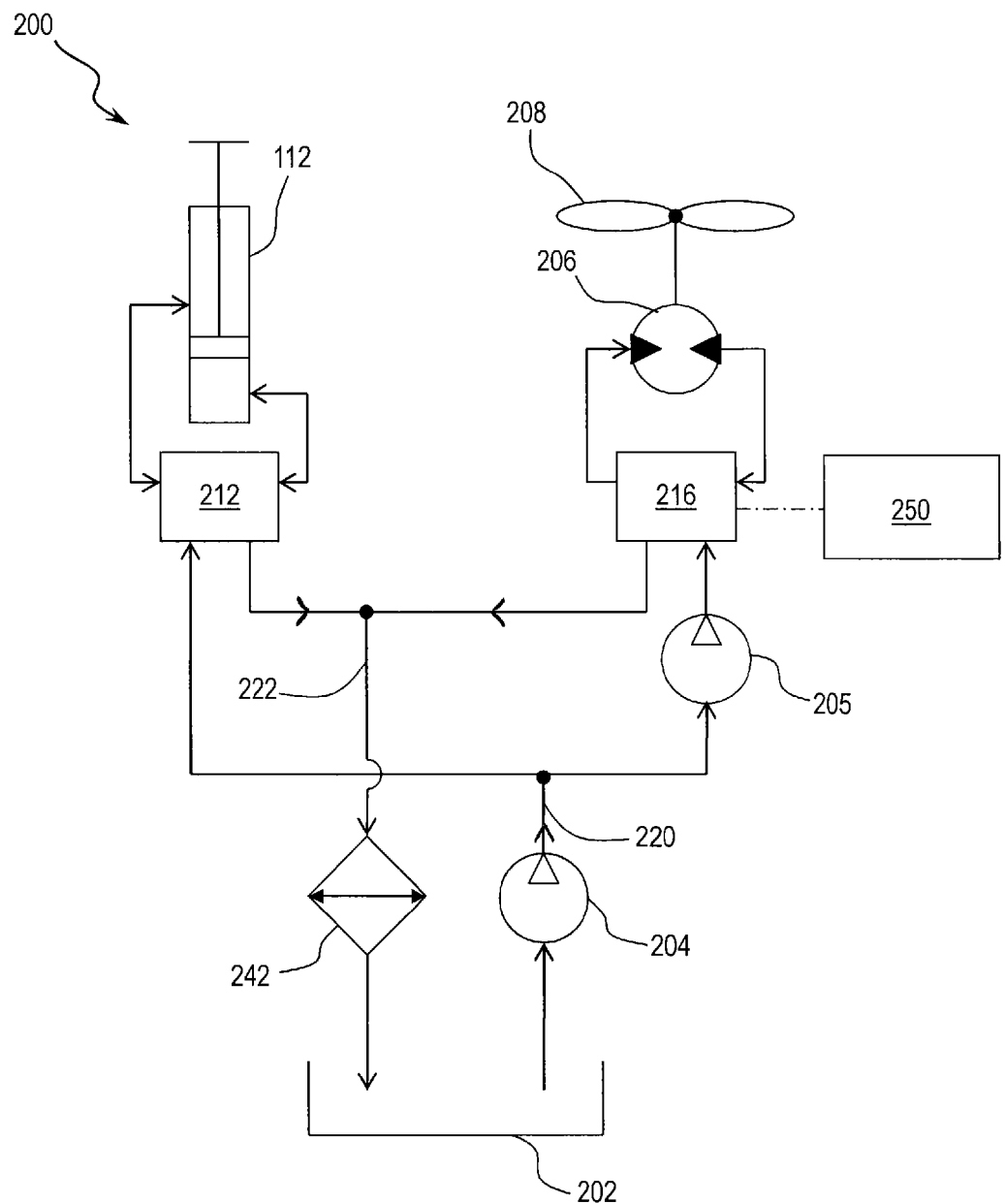
FIG. 2 provides an exemplary hydraulic circuit for operating the excavator of FIG. 1A.

Referring to FIGS. 1A and 1B, vehicle 100 includes chassis 102. At least one traction device 104, illustratively a plurality of tracks 104A in FIG. 1A or a plurality of wheels 104B in FIG. 1B, is provided to support chassis 102 on the ground. Chassis 102 defines an engine compartment 114 that houses and protects an engine 116 (FIG. 2). In use, engine 116 provides motive force to power traction devices 104 to propel chassis 102 across the ground. In an exemplary embodiment, engine 116 is an internal-combustion engine, though it is also within the scope of the present disclosure that engine 116 may take the form of an electric motor, hydraulic motor, or hybrid motor utilizing one or more of internal combustion, electric or hydraulic power sources or engine 116 may be operably coupled to fraction device 104 through a generator that provides electricity to electric motors.

Vehicle 100 further includes fuel refill access cap 130 (FIGS. 1B and 1C), which is selectively covered over by a fuel access cover 132. Cap 130 offers access to the main fuel source of vehicle 100, such as a liquid fuel tank for internal combustion power sources. For liquid fuel tanks, a strainer may be provided below access cap 130, such as in the neck of the fuel tank. As illustrated with respect to loader 100B, cap 130 is located aft of operator cab 106 and below cooling assembly 300 (described further below).

Vehicle 100 further includes at least one work tool, illustratively a front-mounted excavator bucket 108A in FIG. 1A or a front-mounted loader bucket 108B in FIG. 1B. Bucket 108A generally faces the operator of vehicle 100A, and is moveably coupled to chassis 102A via boom assembly 110A for rearward-scooping, carrying, and dumping dirt and other materials. Similarly, bucket 108B faces generally away from the operator of vehicle 100A, and is moveably coupled to chassis 102B via boom assembly 110B for forward-scooping, carrying, and dumping dirt and other materials. Other suitable work tools include, for example, blades, forks, tillers, and mowers. One or more hydraulic cylinders 112 are also provided to provide motive force for movement of bucket 108 and/or boom assembly 110 relative to chassis 102.

Vehicle 100 further includes an operator cab 106 supported by chassis 102 to house and protect the operator of vehicle 100. Operator cab 106 may include a seat and various controls or user inputs (e.g., a steering wheel, joysticks, levers, buttons) for operating vehicle 100, including operation of engine 116 and hydraulic cylinders 112.

Vehicle 100 further includes a brake system, illustrated as brake system 120 in FIG. 1B. Brake system 120 includes brake discs 122 mounted at each wheel 104B, which are operably coupled to brake actuator 124 via a brake line 126. In an exemplary embodiment, operator manipulation of actuator 124 is transferred to brake discs 122 via hydraulic pressure in lines 126, though cable or other mechanical suitable actuation may be used. Actuator 124 may include an actuator for in-service application of brakes, such as a pedal to which the operator applies pressure to slow or stop vehicle 100B during operation.

In addition, actuator 124 may include a separate actuator, or a special actuation mode of the in-service actuator, for a parking brake functionality designed to maintain vehicle 100B in a stopped position when not in operation. In one exemplary embodiment, actuator 124 may include a separate pedal or handle, which effects actuation of brake discs 122 via brake line 126 and thereby activates the parking brake. In another exemplary embodiment, the in-service brake pedal may operate to selectively latch in an actuated position. In either case, parking brake functionality is characterized by latched actuation of brake system 120 upon activation of actuator 124, such that the brake system 120 remains engaged unless affirmatively disengaged by the operator. This parking brake functionality is distinguished from in-service braking, in which actuation of brake system 120 requires sustained operator input of actuator 124.

Although not illustrated in FIG. 1A, excavator 100A also includes a braking system acting upon tracks 104A, and includes both in-service and parking-brake functions.

As shown in described in further detail below, braking system 120 cooperates with controller 250 to restrict selected functions of the cooling system 240 of vehicle 100, such that such functions operate only when vehicle 100 is running and in-service. To this end, brake actuator 124 includes a parking brake sensor 270 (FIG. 3) which is activated and deactivated in concert with the activation or deactivation of the parking brake functionality.

Turning now to FIG. 2, a hydraulic circuit 200 is provided for operating hydraulic functions of vehicle 100. The illustrative hydraulic circuit 200 of FIG. 2 includes a source or reservoir 202 of hydraulic fluid (e.g., oil), one or more pumps 204, 205, and at least one hydraulic actuator. In FIG. 2, the hydraulic actuators include hydraulic cylinder 112, which operates bucket 108 (FIG. 1A), and hydraulic motor 206, which operates fan 208. Fan 208 is described further below with reference to FIGS. 1C and 3. It is within the scope of the present disclosure that other hydraulic actuators may be provided to perform other hydraulic functions of vehicle 100. The illustrative hydraulic circuit 200 of FIG. 2 also includes flow control valves 212, 216, that control cylinder 112 and motor 206, respectively. In an exemplary embodiment, control valves 212, 216 are proportional valves that allow the operator of vehicle 100 to activate cylinder 112 and/or fan 208 at any selected speed from zero to a predetermined maximum activation speed. The illustrative hydraulic circuit 200 of FIG. 2 further includes a first, supply hydraulic flow path 220 from reservoir 202 to the flow control valves 212, 216, and a second, return hydraulic flow path 222 from the flow control valves 212, 216, back to reservoir 202.

Figure 3:
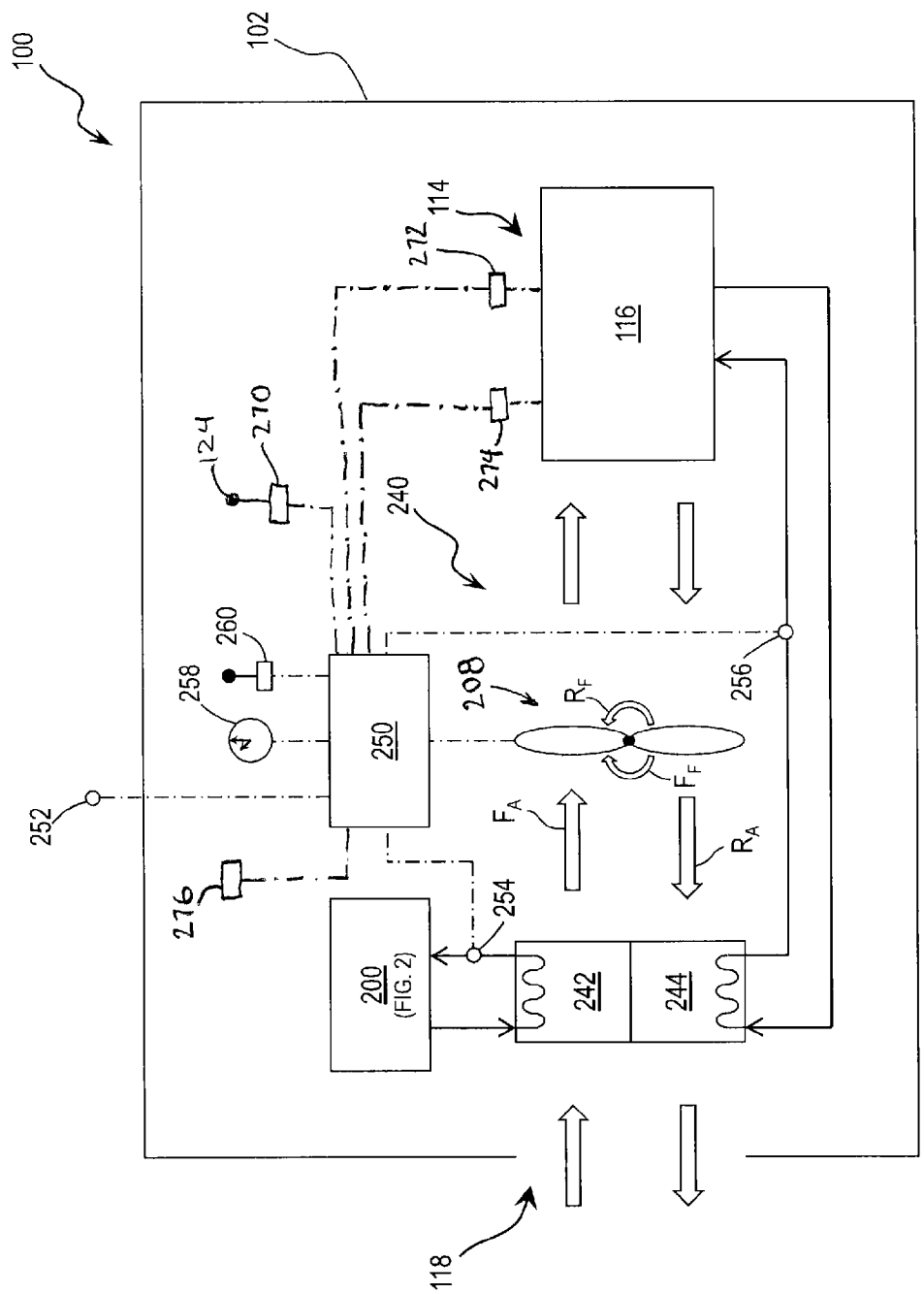
FIG. 3 is a schematic diagram of an exemplary cooling system for the excavator of FIG. 1A.

Referring next to FIG. 3, a cooling system 240 is provided to cool various systems of vehicle 100. The illustrative cooling system 240 of FIG. 3 includes at least one heat exchanger or cooler (e.g., a radiator), illustratively a first, hydraulic cooler 242 and a second, engine cooler 244. The illustrative cooling system 240 of FIG. 3 also includes fan 208. The hydraulic cooler 242 of FIG. 3 may receive hydraulic fluid from the above-described reservoir 202 of hydraulic circuit 200. Returning briefly to FIG. 2, hydraulic cooler 242 is shown positioned along the return hydraulic flow path 222 of hydraulic circuit 200 to cool the hydraulic fluid returning from cylinder 112 and/or motor 206 before the hydraulic fluid returns back to reservoir 202. Turning back to FIG. 3, the engine cooler 244 may receive an engine coolant that circulates around and/or through engine 116.

Coolers 242, 244, are illustratively arranged in a side-by-side configuration, but it is also within the scope of the present disclosure that coolers 242, 244, may be arranged in a stacked configuration, with one cooler 242 stacked on top of the other cooler 244, for example. In one exemplary embodiment shown in FIGS. 1B and 1C, loader 100B may include cooling assembly 300 disposed aft of operator cab 106B and including coolers 242, 244. As illustrated, coolers 242, 244 take the form of radiators which form a part of side walls 308, 310 of the box-shaped cooling assembly 300, with cooling fan 208 forming a part of a pivoting rear wall 312 of the structure.

The illustrative cooling system 240 of FIG. 3 further includes a controller 250 that controls fan 208. Controller 250 may control fan 208 to maintain the hydraulic fluid within a desired temperature range by way of hydraulic cooler 242 and/or to maintain the engine coolant within a desired temperature range by way of engine cooler 244. Controller 250 may control the speed of fan 208. For example, controller 250 may operate fan 208 at a full speed (e.g., 100%), a stopped speed (e.g., 0%), and at a plurality of intermediate speeds therebetween (e.g., 1%-99%). Controller 250 may also control the direction of fan 208 to operate fan 208 in a first, forward or cooling mode or a second, reverse or cleaning mode. In FIG. 2, controller 250 is shown communicating with flow control valve 216 to control the operation of motor 206 and fan 208. The interaction between controller 250 and flow control valve 216 is discussed further below with reference to FIG. 4.

In the forward or cooling mode, controller 250 rotates fan 208 in a forward fan direction $F_F$ to pull cool, ambient air into chassis 102 and across coolers 242, 244 in a forward air direction $F_A$, as shown in FIG. 3.

For excavator 100A (FIG. 1A), the cool, ambient air may enter chassis 102A via an opening 118A in chassis 102A formed in a side wall of chassis 102A, and may be partially covered with a protective screen or grille, for example. The screen or grille may be moveably coupled to chassis 102A to allow the operator to open the screen or grill and access fan 208, coolers 242, 244, and other components of cooling system 240. The cool, ambient air may cool the hydraulic fluid in hydraulic cooler 242 and the engine coolant in engine cooler 244. After passing across coolers 242, 244, the ambient air may continue to travel through chassis 102 in the forward air direction $F_A$ and into engine compartment 114, which may facilitate direct air cooling of engine 116.

For loader 100B (FIGS. 1B and 1C), the rear wall including cooling fan 208 may pivoted into an operating position as shown in FIG. 1B and activated to draw ambient air through the side walls and coolers 242, 244, which form the inlets of cooling assembly 300. This air picks up heat from coolers 242, 244, which have hot hydraulic and/or engine coolant fluid circulating through respective heat exchange tubes running along the surface of coolers 242, 244. The hot air is allowed to mix in cavity 302 of assembly 300, and is subsequently exhausted to the aft of vehicle 100B by fan 208.

Figure 1C:
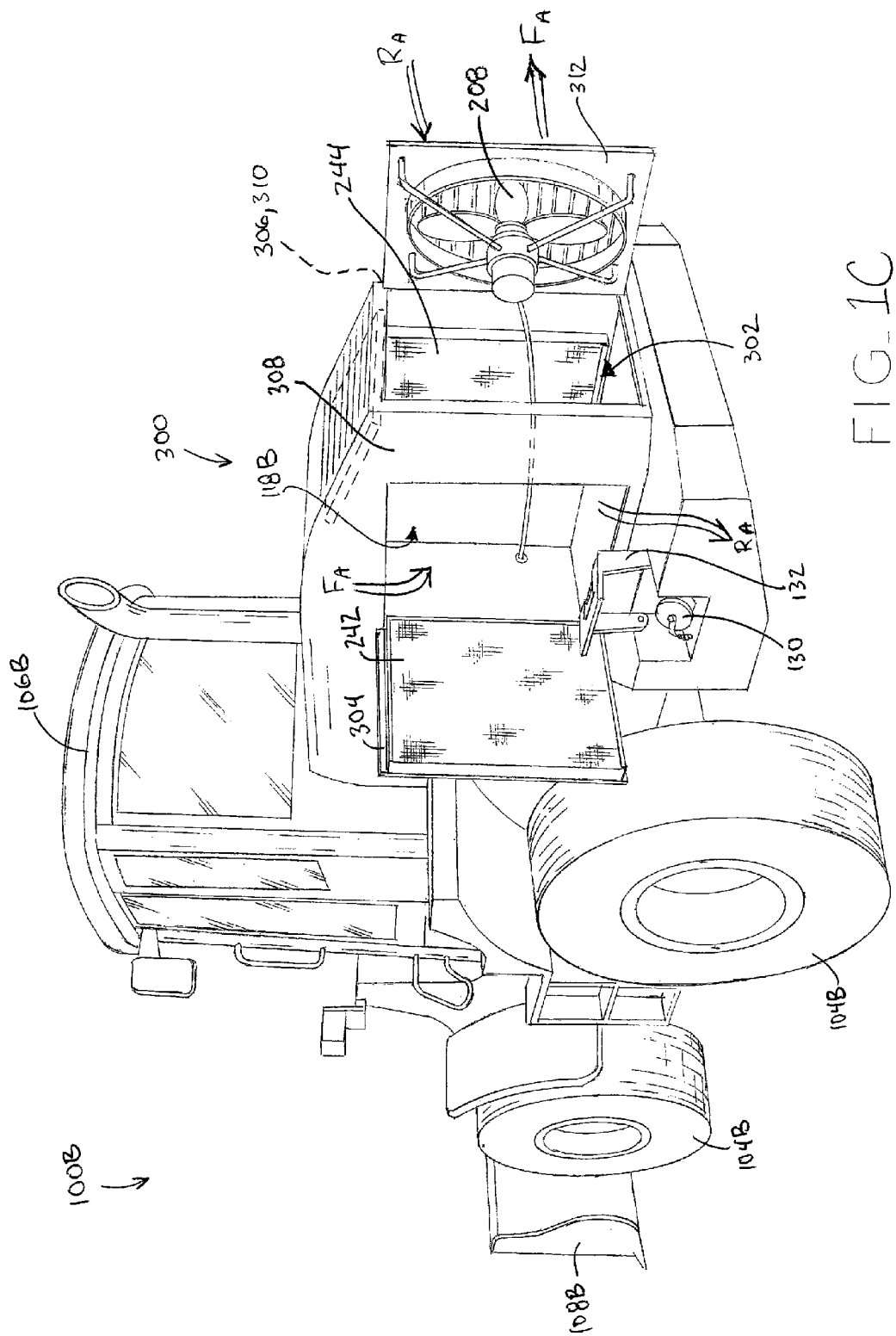
FIG. 1C is a perspective view of a portion of the loader of FIG. 1B, shown with covers open.

In an exemplary embodiment, the sidewalls formed by coolers 242, 244 may be selectively covered by filter screens 304, 306 (only the left-side screen 304 is shown in FIGS. 1B and 1C, it being understood that a substantially identical right-side screen 306 is symmetrically disposed on the right side of assembly 300). When vehicle 100B is in operation, filter screens 304, 306 are in the closed position of FIG. 1B and form a barrier against the flow of particulate matter and airborne debris from the ambient air to cooler 242. As further described below, accumulated material trapped in filter screens 304, 306 may be selectively discharged by reversing the direction of fan 208. In addition, screens 304, 306 may be pivoted away from cooler 242, 244 respectively (as shown in FIG. 1C) to facilitate manual cleaning of both screens 304, 306 as well as coolers 242, 244.

In the reverse mode, controller 250 rotates fan 208 in a reverse fan direction $R_F$ shown in FIG. 3 (which is opposite the forward fan direction $F_F$) to push ambient air into cavity 302 of assembly 300, and subsequently exhaust the air across coolers 242, 244 in a reverse air direction $R_A$ (which is opposite the forward air direction $F_A$), as shown in FIGS. 1C and 3. After passing across coolers 242, 244, the air may exit chassis 102 in the reverse air direction $R_A$, which clears away accumulated dirt and debris collected on and near opening 118 during the forward mode of operation. In the case of excavator 100A, this accumulated dirt and debris will be trapped at the screen disposed over opening 118A of chassis 102A, while for loader 100B, screens 304, 306 will trap a majority of dirt and debris.

Controller 250 may selectively operate fan 208 in the reverse mode to effect regular cleaning cycles for coolers 242, 244 and the associated debris screens (e.g., screens 304, 306). In an exemplary embodiment, controller 250 operates fan 208 in either forward or reverse modes depending on time data received from a timer 258 (FIG. 3), which measures the time of operation of vehicle 100 since the last reverse operation of fan 208 (i.e., the last cleaning cycle). In operation, controller 250 receives this time input data from timer 258, processes the time input data, and communicates with the flow control valve 216 of motor 206 (FIG. 2) to control the operation of fan 208 in either forward direction $F_F$ or reverse direction $R_F$ based on the processed time data. For example, controller 250 may be programmed to periodically clean or "flush" coolers 242, 244 by reverse operation of fan 208 at set intervals, such as after a predetermined number of hours of operation. This predetermined number may be programmed depending on the expected service environment of vehicle 100, the size and capacity of cooling system 240, and/or user preference, for example. In certain exemplary embodiments, the timed interval (i.e., the predetermined time threshold beyond which a change to reverse fan direction $R_F$ occurs) may as little as 3 hours, 5 hours or 7 hours, or may be as much as 12 hours, 18 hours or 24 hours, or may be any time within or outside of any range defined by any of the foregoing values.

In addition to reverse operation of fan 208 based on time intervals, controller 250 may also account for the status of engine 116 in executing a cleaning cycle. As illustrated in FIG. 3, engine sensor 272 measures the speed (rpm) of engine 116 (which is variable according to inputs by the operator) and outputs a signal to controller 250 indicative of the engine activation and speed. In an exemplary embodiment, controller 250 initiates a cleaning cycle (that is, runs fan 208 in reverse direction $R_F$) when engine sensor 272 indicates that engine 116 is activated and running at a predetermined minimum engine speed. This engine speed setpoint may be set high enough to ensure that engine 116 is developing sufficient power to drive fan 208 at full capacity, thereby ensuring a maximum amount of debris removal from coolers 242, 244 and the associated screens (e.g., screens 304, 306). In one exemplary embodiment, the setpoint engine speed may be about 1600 rpm for an internal combustion engine. In order to ensure that a cleaning cycle is timely completed while also ensuring that the setpoint engine speed is achieved, controller 250 may be operatively connected to throttle 274. If engine 116 is running and timer 258 indicates that a cleaning cycle should be initiated, but engine speed is too low, controller 250 may activate throttle 274 (provided vehicle 100 is in a neutral or non-driving state) to bring engine 116 to the minimum setpoint engine speed.

Thus, as described in detail above, controller 250 initiates a cleaning cycle when the following conditions are met: 1) a predetermined time of operation has elapsed without a cleaning cycle; 2) engine 116 is running; 3) engine 116 has a predetermined power output and/or rpm.

A cleaning cycle, initiated by controller 250 reversal of fan 208 as described above, may be interrupted or prevented in certain instances. In one exemplary embodiment, activation of parking brake sensor 270 may cause controller 250 to suspend reverse operation of fan 208 if a cleaning cycle has already begun, or to prevent reverse operation of fan 208 if the other conditions for such operation are met while parking brake sensor 270 is activated. For example, activation of parking brake sensor 270 may suspend the collection by controller 250 of data from timer 258, such that controller ceases to accumulate time toward the next cleaning cycle and associated reversal of fan 208. If a cleaning cycle is underway, that is, if fan 208 is running in reverse direction $R_F$, activation of parking brake sensor 270 may cause controller 250 to suspend operation of fan 208, or to reverse the fan direction back to the forward direction $F_F$, for as long as parking brake sensor 270 remains activated. When sensor 270 deactivates, controller may continue collecting data from timer 258 and/or running fan 208 in reverse direction $R_F$ until the cleaning cycle is completed.

Because parking brake system 120 is designed to be disengaged during vehicle operation and engaged at all other times, the above-described modality of interrupting or preventing initiation of the cleaning cycle ensures that reversal of fan 208 will only occur when the operator is in cab 106. This, in turn, protects the operator from any blowing debris during the cleaning cycle. In addition, an operator desiring to fuel vehicle 100 without shutting down engine 116 may set parking brake actuator 124 (thereby activating parking brake sensor 270), remove the fuel access cap 130 (FIG. 1C), and deposit fuel with assurance that a cleaning cycle will not initiate. According to yet another embodiment, the cleaning cycle is stopped if already initiated when the parking brake is applied or fuel access cap removed and continues later. This, in turn, protects the fuel tank and operator from exposure to any blowing debris that may be dislodged during the cleaning cycle, while allowing the operator to conduct the fueling operation without completely shutting down engine 116. According to one embodiment, the cleaning cycle continues if already initiated when the parking brake is applied or fuel access cap removed.

As a redundant or alternative measure to prevent a cleaning cycle from initiating or continuing during fueling, fuel access cover 132 may include fuel access sensor 276 operably connected to controller 250, as shown in FIG. 3. When cover 132 is opened (as shown in FIG. 1C), sensor 276 activates and sends (or interrupts) a signal to controller 250. Controller 250 may respond by interrupting or preventing initiation of a cleaning cycle in similar fashion as described above.

When a cleaning cycle is complete, controller 250 may then resume operation of fan 208 in the forward, cooling mode to cool and/or maintain the temperature of the hydraulic fluid and/or engine coolant as described herein.

As described above and shown in FIG. 3, the forward and reverse modes are achieved by changing the direction of rotation of fan 208. Specifically, the forward mode is achieved by rotating fan 208 in the forward fan direction $F_F$, and the reverse mode is achieved by rotating fan 208 in the reverse fan direction $R_F$. It is also within the scope of the present disclosure to achieve the forward and reverse modes by manipulating the blades of fan 208, for example, without changing the direction of rotation of fan 208. Such fans are available from Flexxaire of Alberta, Canada.

In addition to the timed and regulated operation of fan 208 discussed above, controller 250 may also control fan 208 based on temperature data from one or more temperature sensors. In FIG. 3, controller 250 communicates with a first temperature sensor 252 that measures the temperature of the ambient air around vehicle 100, a second temperature sensor 254 that measures the temperature of the hydraulic fluid in vehicle 100, and a third temperature sensor 256 that measures the temperature of the engine coolant in vehicle 100.

In operation, controller 250 may receive temperature input data from one or more temperature sensors 252, 254, 256, process the temperature input data, and communicate with the flow control valve 216 of motor 206 (FIG. 2) to control the operation of fan 208 based on the processed temperature data. If temperature sensor 252 detects a low ambient air temperature (such as when operating vehicle 100 in a cold climate), for example, controller 250 may be able to reduce the speed of fan 208 in the forward or cooling mode while still achieving adequate cooling of the hydraulic fluid and the engine coolant in coolers 242, 244, respectively. However, if temperature sensors 254, 256 detect a high hydraulic fluid temperature and/or a high engine coolant temperature, controller 250 may increase the speed of fan 208 to achieve more cooling in coolers 242, 244, respectively.

Controller 250 may also use temperature data received from one or more of temperature sensors 252, 254, 256 to selectively operate fan 208 either in forward direction $F_F$ to effecting cooling of engine 116 and/or the hydraulic fluid in hydraulic circuit 200, or in reverse direction $R_F$ to warm the hydraulic fluid. Further disclosure of the warming/reverse functionality of controller 250 and fan 208 is described in U.S. patent application Ser. No. 13/863,826, filed Apr. 16, 2013 and entitled HYDRAULIC FLUID WARM-UP USING HYDRAULIC FAN REVERSAL, which is co-owned with the present application, the entire disclosure of which is hereby expressly incorporated herein by reference.

Controller 250 may also provide for manual reversal of the fan 208 while the parking brake actuator 124 is applied. In FIG. 3, controller 250 communicates with a user input device 260, which may allow the operator of vehicle 100 to power fan 208 on/off, select the speed of fan 208, and/or select the direction of fan 208, for example. In operation, controller 250 may receive a manual input from the user input device 260, process the manual input, and communicate with the flow control valve 216 of motor 206 (FIG. 2) to control the operation of fan 208 based on the processed input. The user input device 260 may be located in operator cab 106 of vehicle 100 (FIG. 1A) for access and use by the operator.

It is within the scope of the present disclosure that controller 250 may control fan 208 based on a combination of temperature inputs, time inputs, and/or manual inputs. For example, controller 250 may wait a predetermined time before powering on fan 208, and then controller 250 may receive temperature data to control further operation of fan 208.

As discussed above with reference to FIG. 2, controller 250 communicates with flow control valve 216 to control the operation of motor 206 and fan 208. An exemplary flow control valve 216 is shown in more detail in FIG. 4.

Figure 4:
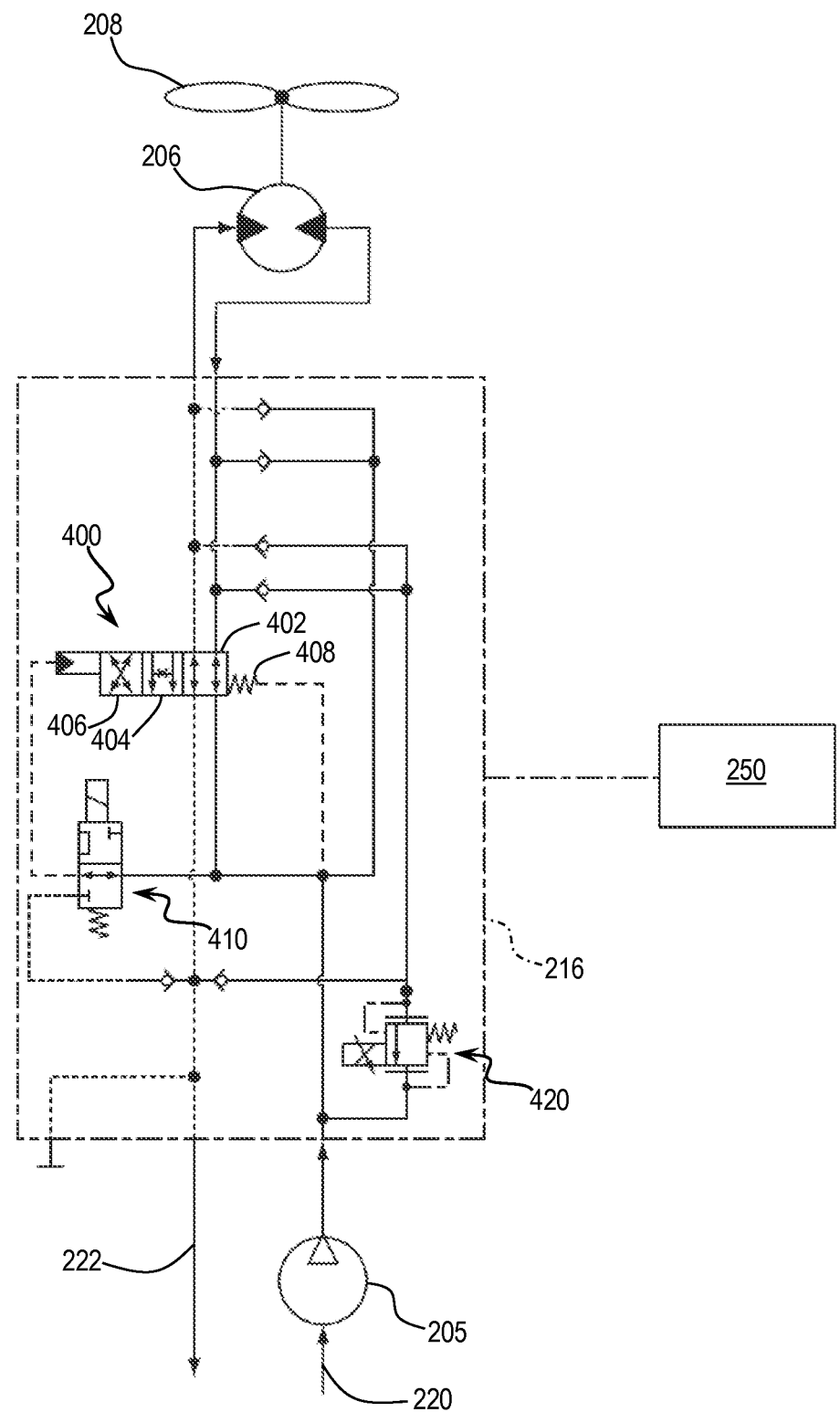
FIG. 4 shows an exemplary flow control valve for use in the hydraulic circuit of FIG. 2.

Flow control valve 216 of FIG. 4 includes a proportional, pilot-operated main valve 400 having a forward position 402, a stopped position 404, and a reverse position 406. Main valve 400 controls both the speed and the direction of fan 208. When main valve 400 is in the forward position 402, motor 206 operates fan 208 in the forward mode at a full speed (e.g., 100%). When main valve 400 is in the stopped position 404, motor 206 stops fan 208 (e.g., 0%). When main valve 400 is in the reverse position 406, motor 206 operates fan 208 in the reverse mode at full speed (e.g., 100%). Between the stopped position 404 and the forward and reverse positions 402, 406, motor 206 operates fan 208 at intermediate speeds (e.g., 1%-99%).

Flow control valve 216 of FIG. 4 also includes a solenoid-operated regulating valve 410 in communication with main valve 400. When energized, regulating valve 410 directs a fluid to main valve 400 to shift main valve 400 from its normal forward position 402 to the stopped position 404 or the reverse position 406.

Flow control valve 216 of FIG. 4 further includes a solenoid-operated restricting valve 420 in communication with main valve 400. When energized, restricting valve 420 directs pressure toward spring 408 of main valve 400 to restrict movement of main valve 400, thereby controlling the speed of fan 208 from main valve 400.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle comprising:
a chassis;
at least one traction device supporting the chassis on the ground;
an engine that defines an engine speed, the engine operably coupled to the at least one traction device to propel the chassis across the ground;
at least one of a brake system including a parking brake actuatable to maintain the work vehicle in a stopped position and a fuel access cover;
a cooling system supported by the chassis, the cooling system comprising:
a first cooler that receives a fluid to be cooled;
a hydraulic cooler;
a fan having:
a first mode of operation, wherein the fan directs air across the first cooler and the hydraulic cooler in a first direction; and
a second mode of operation, wherein the fan directs air across the first cooler and the hydraulic cooler in a second direction opposite the first direction; and
a controller that only initiates operation of the fan in the second mode of operation when the engine speed is at or above a predetermined setpoint
wherein the cooling system is in fluid communication with the engine to receive engine coolant as the fluid to be cooled;
wherein the first cooler and the hydraulic cooler form at least a part of respective side walls of a cooling assembly, the cooling assembly defining a cavity between the respective side walls; and
wherein the fan is disposed at a rear wall of the cooling assembly, the fan operable to pull ambient air into the cavity through the first cooler and the hydraulic cooler in the first mode of operation, and the fan operable to push ambient air into the cavity and subsequently through the first cooler and the hydraulic cooler in the second mode of operation.

2. The work vehicle of claim 1, wherein when the engine speed is at or above the predetermined setpoint the engine provides sufficient power to drive the fan in the second mode of operation.

3. The work vehicle of claim 2, wherein the engine comprises an internal combustion engine and the predetermined setpoint is about 1600 rpm.

4. The work vehicle of claim 1, wherein the work vehicle includes both the brake system and the fuel access cover, the controller prevents operation of the fan in the second mode of operation when the parking brake is actuated or the fuel access cover is open.

5. The work vehicle of claim 1, wherein the fan rotates in opposite directions in the first and second modes of operation.

6. The work vehicle of claim 1, wherein the cooling system:
pulls ambient air through the first cooler and the hydraulic cooler into the cavity of the cooling system and subsequently exhausts the air from the cavity through the rear wall in the first mode of operation; and
pushes ambient air into the cavity through the rear wall and subsequently exhausts the air from the cavity through the first cooler and the hydraulic cooler in the second mode of operation.

7. The work vehicle of claim 1, further comprising at least one hydraulic actuator that receives hydraulic fluid, the hydraulic cooler of the cooling system is in fluid communication with the at least one hydraulic actuator to receive and cool the hydraulic fluid.

8. A work vehicle comprising:
a chassis;
at least one traction device supporting the chassis on the ground;
an engine that defines an engine speed and is operably coupled to the at least one traction device to propel the chassis across the ground;
a cooling system comprising:
a first cooler that receives a fluid to be cooled;
a hydraulic cooler;
a fan having:
a first mode of operation, wherein the fan directs air across the first cooler and the hydraulic cooler in a first direction; and
a second mode of operation, wherein the fan directs air across the first cooler and the hydraulic cooler in a second direction opposite the first direction; and
a controller that only initiates operation of the fan in the second mode of operation when the engine speed is at or above a predetermined setpoint;
wherein the cooling system is in fluid communication with the engine to receive engine coolant as the fluid to be cooled;
wherein the first cooler and the hydraulic cooler form at least a part of respective side walls of a cooling assembly, the cooling assembly defining a cavity between the respective side walls; and
wherein the fan is disposed at a rear wall of the cooling assembly, the fan operable to pull ambient air into the cavity through the first cooler and the hydraulic cooler in the first mode of operation, and the fan operable to push ambient air into the cavity and subsequently through the first cooler and the hydraulic cooler in the second mode of operation.

9. The work vehicle of claim 8, further comprising a brake system including a parking brake actuatable to maintain the work vehicle in a stopped position, wherein the controller prevents operation of the fan in the second mode of operation when the parking brake is actuated.

10. The work vehicle of claim 8, further comprising a timer operably connected to the controller, wherein the controller operates the fan:
in the first mode of operation when the engine coolant is above a predetermined temperature and the timer is below a predetermined time threshold; and
in the second mode of operation when the timer is above the predetermined time threshold and the engine speed is above the predetermined setpoint.

11. The work vehicle of claim 8, further comprising a fuel refill access cap accessible via a fuel access cover, the controller preventing operation of the fan in the second mode of operation when the fuel access cover is open.

12. The work vehicle of claim 8, wherein the fan rotates in opposite directions in the first and second modes of operation.

13. The work vehicle of claim 8, further comprising at least one hydraulic actuator that receives hydraulic fluid, the hydraulic cooler of the cooling system is in fluid communication with the at least one hydraulic actuator to receive and cool the hydraulic fluid.

14. The work vehicle of claim 13, wherein the at least one hydraulic actuator includes a hydraulic motor that operates the fan.

15. The work vehicle of claim 13, wherein the at least one hydraulic actuator includes a hydraulic cylinder that operates a work tool.

16. A method of operating a work vehicle, the work vehicle comprising an engine defining an engine speed, a cooling system including a first cooler, a hydraulic cooler and at least one of a brake system including a parking brake actuatable to maintain the work vehicle in a stopped position and a fuel access cover, the first cooler and the hydraulic cooler forming at least a part of respective side walls of a cooling assembly, the cooling assembly defining a cavity between the respective side walls and a rear wall, the method comprising the steps of:
  pulling ambient air into the cavity through the first cooler and the hydraulic cooler in a forward direction and exhausting the air through the rear wall to effect cooling of the first cooler and the hydraulic cooler;
  pushing ambient air into the cavity through the rear wall and exhausting the air through the first cooler and the hydraulic cooler in a reverse direction to effect cleaning of the first cooler and the hydraulic cooler; and
  only initiating the flow of air in the reverse direction when the engine speed is at or above a predetermined setpoint.

17. The method of claim 16, wherein the work vehicle includes a hydraulic actuator that receives hydraulic fluid, the hydraulic cooler being in fluid communication with the hydraulic actuator to receive the hydraulic fluid, and wherein:
  the step of pulling ambient air in the forward direction effects cooling of the hydraulic fluid in the hydraulic cooler.

18. The method of claim 16, wherein the step of pushing ambient air across the cooler in a reverse direction is based on engine speed being at or above the predetermined setpoint and at least one of:
  a time input;
  an engine activation input; and
  a fuel cover activation input.

19. The method of claim 16, wherein:
  the step of pushing ambient air in the reverse direction includes operating a fan in a reverse mode; and
  the step of pulling ambient air in the forward direction includes operating the fan in a forward mode.

20. The method of claim 16, wherein the first cooler is in fluid communication with the engine to receive engine coolant, and wherein:
  the step of pulling ambient air in the forward direction effects cooling of the engine coolant in the first cooler.

* * * * *